United States Patent Office 3,117,046
Patented Jan. 7, 1964

3,117,046
PROCESS FOR JOINING A POLYCARBONATE RESIN SHEET TO A CELLULOSE ESTER SHEET
Helfried Klockgether and Eugen Bock, Leverkusen, and Walther Cohnen, Cologne-Mulheim, Germany, assignors to Agfa Aktiengesellschaft, Leverkusen, Germany, a corporation of Germany
No Drawing. Filed Sept. 27, 1960, Ser. No. 58,612
Claims priority, application Germany Sept. 30, 1959
9 Claims. (Cl. 156—304)

The present invention relates to a process for cementing polycarbonate resin sheets to cellulose ester sheets.

Films consisting of polycarbonates, more especially polycarbonates of bis(hydroxyphenyl)alkanes, are suitable for many uses because of their excellent mechanical properties. For example, their use as a film support for photographic silver halide emulsions is described in German Patent No. 1,001,586, for magnetic sound carriers in German Patent No. 1,035,375 and for electric insulating sheets in German Patent No. 962,274. Although polycarbonate resin films or sheets are sometimes excellently suitable as regards quality, their use for many of these applications necessitates that the sheets be cemented or spliced to the film material, especially when the film is formed of a cellulose ester hitherto used for the purpose.

Whereas both the cementing of polycarbonate sheets to one another and also of cellulose ester sheets to one another does not present any difficulties (it generally being sufficient for the splicing surfaces to be superficially softened with a suitable solvent, the surfaces then being pressed one against the other for a short time), a suitable process for cementing polycarbonate sheets to cellulose ester sheets is still unknown.

In spite of similar solubility properties, the otherwise usual coating with solvents does not lead to the required result. Similarly, by using adhesive which have proved suitable for many other purposes, largely independently of their chemical nature, no useful results were obtained. Adhesive joints produced in this way show a low initial strength and are not equal to any mechanical stressing, even after being kept for a relatively long time.

It has now been found that isocyanate-modified, linear or branched polyoxy compounds which are soluble in organic solvents and are of high molecular weight are excellently suitable for sticking foils of high-molecular linear polycarbonates to foils of inorganic or organic cellulose esters. Such polyoxy compounds are described in German Patent Nos. 897,625 and 1,012,456.

German Patent No. 897,625 discloses diisocyanate-modified soluble linear polyesters which are produced solely by the use of bifunctional starting compounds. These products can be prepared by condensing products as for example hydroxy carboxylic acids, equimolecular admixtures of glycols and dicarboxylic acids, ω-amino alcohols and dicarboxylic acids to polyesters of moderately high molecular weight. To these condensates a suitable amount of a diisocyanate such as octamethylene diisocyanate, hexamethylene diisocyanate, diphenyl-4,4-diisocyanate are added. That mixture is heated until the degree of polymerization desired is reached.

Soluble branched isocyanate-modified polyhydroxy compounds are described in German Patent No. 1,012,456, and in British Patent No. 787,592. These products are prepared by reacting a polyhydroxy compound, for example a polyester, polyalkylene glycol or combinations thereof, if desired in admixture with a small amount of a polyfunctional component, for example a polyhydric alcohol with a polyisocyanate, preferably a diisocyanate in such proportions that the reaction product contains free hydroxyl groups.

The soluble branched isocyanate-modified polyhydroxy compounds used in the process of the invention can be prepared for example by condensing in known manner diols and dicarboxylic acids or hydroxycarboxylic acids in the presence of small amounts of a higher than bifunctional alcohol component or acid component, weakly branched polyesters of moderately high molecular weight being produced. These polyesters are then reacted with diisocyanates to form the final products in accordance with the invention. Moreover, strictly linear, and therefore bifunctional polyesters of moderately high molecular weight can be mixed with a small amount of a polyfunctional component such as, for example, a polyhydric alcohol and the resulting mixture reacted with a diisocyanate to give the required final product. The polyfunctional component used in this reaction can also contain hetero atoms or aromatic, hydroaromatic or heterocyclic ring systems.

In addition, similar products are obtained if linear polyesters are reacted with diisocyanates and a small amount of a triisocyanate or a higher than trifunctional isocyanate.

An additional class of substances are the polyglycol ethers which can be produced by the polymerization of alkylene oxides; this class of substances, when used together with a small amount of a higher than bifunctional polyhydroxy component, can be reacted with a diisoycanate, or when used alone can be reacted with a diisocyanate and a small amount of a higher than bifunctional isocyanate, to form isocyanate-modified polyhydroxy compounds having the properties indicated above.

Combinations of polyglycol ethers and polyesters can also be used, so that the number of starting materials suitable for use in the process of the present invention is very large.

In each case, by using an appropriate amount of the polyfunctional component the required degree of branching is obtained, and then a measurement is taken of the specific viscosity of the branched isocyanate-modified polyhydroxy compound in 0.1 percent m-cresol solution at 25° C.

Furthermore, the branched isocyanate-modified polyhydroxy compounds can be reacted with an additional amount of a polyisocyanate, such as, for example, tolylene diisocyanate, p-phenylene diisocyanate, 4,4'-diphenylmethane diisocyanate, tetra-methylene diisocyanate, hexamethylene diisocyanate, ω,ω'-dipropylether diisocyanate, cyclohexane-1,4 - diisocyanate, dicyclohexylmethane-4,4'-diisocyanate, diphenyl-dimethylmethane-4,4'-diisocyanate, 1-methyl - benzene - 2,4,6-triisocyanate, - 1 - methyl-3,5-diethyl-benzene-2,4,6-triisocyanate or polyisocyanates prepared from polyhydric alcohols and diisocyanates. Alternatively it is possible to use a compound which reacts as a polyisocyanate when heated; for example compounds known in the literature to split off isocyanate when heated, such as dimeric arylene diisocyanates or polymerization products of polyisocyanates can be used.

The film-forming products are dissolved in a suitable solvent, more especially a chlorinated hydrocarbon such as methylene chloride, ethylene chloride or acetone. The concentration can be varied within wide limits, but the most favorable results are produced with substantially 2–4 percent solutions.

For producing an adhesive joint, the surfaces to be stuck are coated with the adhesive and pressed together. After being stored for a few hours the strength of the adhesive joint is equal to most requirements.

Where the requirements as regards mechanical strength of the adhesive joints are very high, a further improvement in the adhesive effect can be produced with certain additives.

The additives which have proved especially suitable are polyisocyanates, such as for example, hexamethylene diisocyanate, 1-methylbenzene-2,6-diisocyanate, 1-methylbenzene-2,4-diisocyanate, naphthalene-1,5-diisocyanate, triphenyl methane-4,4'-4''-diisocyanate, diphenylmethane-4,4'-diisocyanate; also reaction products of polyhydric alcohols (such as hexanetriol, glycerine or trimethylol propane), with an excess of diisocyanates, trimerization products of diisocyanates, phosphorus-containing polyisocyanates, for example, those described in our French Patent No. 1,225,715. The quantity of added polyisocyanate can be varied within wide limits and depends substantially on the chemical constitution of the compound concerned. The best results were generally produced with quantities of 5–25 parts of polyisocyanate to 100 parts of the isocyanate-modified polyoxy compound.

Furthermore, additions of cellulose esters, more especially cellulose acetobutyrates, are very effective and the composition thereof can be varied within wide limits. The most favorable results are produced with products of which the acetic acid content is between 41 percent and 24 percent and of which the butyric acid content is between 17.5 percent and 42.5 percent. The products can moreover be partially saponified. The additions to these cellulose esters preferably vary between 10 percent and 50 percent, related to the total concentration.

By using these additives, the initial strengths, and more especially the final strengths produced during storage are considerably improved, so that these satisfy all practical requirements, even with narrow spliced joints.

If a very high initial strength is required after periods of pressure of only a few minutes, the cementing with a sheet produced from a solution of the isocyanate-modified polyoxy compounds alone or with a sheet produced in admixture with the aforementioned cellulose derivatives has proved advantageous. The thickness of such a sheet is preferably kept between 0.02 and 0.15 mm.

The invention is further illustrated by the following examples:

Example 1

A sheet of cellulose triacetate and a sheet of a polycarbonate of 2,2-di-(4-hydroxyphenyl)-propane as described in German Patent No. 971,790 are coated at the areas to be spliced with a 2 percent solution of a film-forming, isocyanate-modified polyoxy compound of adipic acid, ethylene glycol, diethylene glycol, trimethylol propane and hexamethylene diisocyanate, which is produced as described in Example 1 of German Patent No. 1,012,456, the surfaces are pressed together, and dried for a few hours at room temperature. The spliced joint thus produced cannot be pulled apart.

Example 2

Using a suitable instrument, the photographic emulsion at the splicing position of a 35 mm. cinefilm strip consisting of cellulose triacetate is removed, while the antihalation layer is removed from a 35 mm. cinefilm strip consisting of a polycarbonate as described in German Patent No. 1,001,586. The bared areas are coated with the 2 percent solution in ethylacetate of a polymer consisting of (I) 20 parts of an isocyanate-modified polyoxy compound prepared by linear lengthening of the chain of 100 g. of an adipic acid glycol polyester which was prepared by condensation of 9 parts of adipic acid with 10 parts diethylene glycol, with 7.8–8 g. hexamethylene diisocyanate and (II) 5 parts of a 7.5 percent solution in ethyl acetate of a triisocyanate of 1 mol hexanetriol and 3 mols tolylene diisocyanate and pressed together for a few minutes. After standing for several hours, a very firm joint has been obtained.

Example 3

A 2.5 percent solution of a mixture of 7 parts by weight of an isocyanate-modified polyoxy compound according to Example 2 and 3 parts of a cellulose acetobutyrate with 24 percent acetic acid and 42.5 percent butyric acid is coated on to the surfaces of cellulose triacetate and polycarbonate cinefilms prepared for splicing as in Example 2, and the spliced joint is pressed together for a few minutes. The joint solidifies after being held together for a short time.

Example 4

A sheet with a thickness of 0.15 mm. is cast from a 10 percent solution of isocyanate-modified polyoxy compound in methylene chloride as described in Example 1 hereinbefore. Those surfaces of a cellulose triacetate sheet and of a polycarbonate sheet as described in German Patent No. 971,777 which are to be stuck together are coated with a solvent mixture of 6 parts of methylene chloride and 4 parts of trichlorethylene and pressed together using the cast adhesive film as an intermediate layer. Good initial strength values are produced after a few minutes.

Example 5

A sheet with a thickness of 0.12 mm. is cast from a 10 percent solution of 7 parts of an isocyanate-modified polyoxy compound according to Example 4 and 3 parts of a cellulose acetobutyrate according to Example 3, this sheet being used as in Example 4 for sticking cellulose acetate to a polycarbonate.

Example 6

The procedure described in Example 4 is followed, 2 percent of tolylene diisocyanate being added to the solvent mixture of 6 parts of methylene chloride and 4 parts of trichlorethylene, which is used for coating purposes. The strength values of the adhesive connection were improved.

Example 7

A sheet of cellulose nitrate and a sheet of a polycarbonate as described in Germany Patent No. 971,790 are coated at the surfaces to be stuck together with a 2 percent solution of an isocyanate-modified polyoxy compound according to Example 1, the surfaces are pressed together and dried for a few hours at room temperature. The joint thus produced shows an excellent strength value.

Example 8

A sheet with a thickness of 0.12 mm. is cast from a 10 percent solution of 7 parts of an isocyanate modified polyoxy compound according to Example 4 and 3 parts of a cellulose acetobutyrate according to Example 3. The surfaces of a cellulose triacetate sheet and a polycarbonate sheet as described in German Patent No. 971,777 which are to be spliced together are coated with a 2 percent solution of tolylene diisocyanate in a solvent mixture of 6 parts of methylene chloride and 4 parts of trichlorethylene. The strength value of the supplied joint were improved.

Example 9

A sheet of cellulose acetate, the acetic acid content of which is 60.5 percent, and a sheet of a polycarbonate of 4,4'-dihydroxydiphenylmethylethylmethane are coated at the areas to be stuck together with a 2 percent solution of a film-forming isocyanate-modified polyoxy compound of an adipic acid glycol polyester with trimethylol propane and hexamethylene diisocyanate which is produced as described in Example 5 of German Patent No. 1,012,456. The surfaces are pressed together. The sheet which is backed in such manner is suitable as support for photographic films.

What is claimed is:

1. A process for splicing a sheet of a linear resinous high molecular weight polycarbonate of a bis(hydroxyphenyl)alkane to a sheet of a cellulose ester which comprises coating at least one of the said sheets at the area to be spliced with the reaction product of a polyhydroxy compound and an organic polyisocyanate having a high molecular weight which is soluble in organic solvents, and pressing together the two sheets at the coated area.

2. A process as defined in claim 1 in which at least one of the sheets is coated with a mixture of the reaction product of the polyhydroxy compound and the polyisocyanate and cellulose ester of the group consisting of cellulose acetate, cellulose butyrate and cellulose acetobutyrate.

3. A process as defined in claim 2 in which at least one of the sheets is coated with a mixture of a polyisocyanate and the reaction product of the polyhydroxy compound and the polyisocyanate.

4. A process as defined in claim 2 in which at least one of the sheets is coated with a solution in an organic solvent of the mixture of the cellulose ester and the reaction product of the polyhydroxy compound and the isocyanate in an organic solvent.

5. A process as defined in claim 2 which comprises casting an adhesive sheet consisting of a mixture of a cellulose ester of the group consisting of cellulose acetate, cellulose butyrate, and cellulose acetobutyrate and a reaction product of a polyhydroxy compound and an organic polyisocyanate having a high molecular weight that is soluble in organic solvents, contacting the areas of the polycarbonate sheet and the cellulose acetate sheet to be stuck together with an organic solvent, and pressing together the areas that have been contacted with organic solvent to the adhesive sheet.

6. A process as defined in claim 5 in which the organic solvent with which the areas to be spliced are contacted consists essentially of a lower alkyl chloride containing between 1 and 5 percent of a monomeric aryl diisocyanate.

7. A process as defined in claim 2 in which the sheets to be spliced are each photographic films.

8. A process for joining a sheet of a linear high molecular weight polycarbonate of a bis(hydroxyphenyl) alkane to a sheet of a cellulose ester which comprises bringing the sheets so that portions of them overlap, applying to the overlapping area of at least one of the sheets a layer of an adhesive product having a high molecular weight that is soluble in organic solvents and is the product of the reaction of an organic diisocyanate and a polyhydroxy compound of the group consisting of
   (a) hydrovycarboxylic acids,
   (b) condensation products of hydroxycarboxylic acids and polyhydric alcohols,
   (c) condensation products of glycols and dicarboxylic acids,
   (d) condensation products of glycols, dicarboxylic acids and polyhydric alcohols,
   (e) condensation products of omega-amino alcohols and dicarboxylic acids,
   (f) condensation products of omega-amino alcohols, dicarboxylic acids and polyhydric alcohols,
   (g) polyglycol ethers, and
   (h) condensation products of polyglycol ethers and polyhydric alcohols
and thereafter pressing the sheets together at their overlapping areas.

9. A process for spricing a sheet of a resinous polycarbonate of 2,2-bis(4-hydroxyphenyl)propane and a sheet of cellulose acetate which comprises applying to at least one of the said sheets a solution of a film-forming reaction product of hexamethylene diisocyanate and adipic acid, ethylene glycol, diethylene glycol, and trimethylolpropane, and pressing the two sheets together at the area at which the solution was applied.

References Cited in the file of this patent
UNITED STATES PATENTS

| | | |
|---|---|---|
| 2,698,242 | Saner | Dec. 28, 1954 |
| 2,789,972 | Reynolds et al. | Apr. 23, 1957 |
| 2,874,046 | Klockgether et al. | Feb. 17, 1959 |
| 2,990,379 | Young et al. | June 27, 1961 |